(12) United States Patent
Garcia

(10) Patent No.: US 10,638,871 B2
(45) Date of Patent: May 5, 2020

(54) DUAL-CIRCUIT COFFEE MAKER APPARATUS

(71) Applicant: CE Brands, LLC, Miami, FL (US)

(72) Inventor: Jorge Garcia, Rogers, AR (US)

(73) Assignee: CE BRANDS, LLC, Miami, FL (US)

(*) Notice: Subject to any disclaimer, the term of this patent is extended or adjusted under 35 U.S.C. 154(b) by 133 days.

(21) Appl. No.: 15/451,031

(22) Filed: Mar. 6, 2017

(65) Prior Publication Data

US 2017/0251867 A1 Sep. 7, 2017

Related U.S. Application Data

(60) Provisional application No. 62/303,978, filed on Mar. 4, 2016.

(51) Int. Cl.
*A47J 31/44* (2006.01)
*A47J 31/00* (2006.01)

(52) U.S. Cl.
CPC ......... *A47J 31/4403* (2013.01); *A47J 31/002* (2013.01)

(58) Field of Classification Search
CPC .... A47J 31/4403; A47J 31/002; A47J 31/005; A47J 31/505
USPC ................ 99/323.3, 279, 280–283, 416, 446
See application file for complete search history.

(56) References Cited

U.S. PATENT DOCUMENTS

| | | | | |
|---|---|---|---|---|
| 3,270,918 A | * | 9/1966 | Goodrich | A47J 31/007 137/392 |
| 3,998,143 A | * | 12/1976 | Frye | A47J 31/005 99/280 |
| 4,155,291 A | * | 5/1979 | Ryckman, Jr. | A47J 31/54 219/441 |

* cited by examiner

*Primary Examiner* — Phuong T Nguyen
(74) *Attorney, Agent, or Firm* — Trueba & Suarez PLLC; William R. Trueba, Jr.; Roberto M. Suarez

(57) ABSTRACT

The present invention describes a low-cost apparatus for selectively brewing stronger coffee. The invention provides for a switch and two circuits integral to the coffee maker whereby the user can manually select between a regular brew and a strong brew accomplished by adding in a second circuit.

6 Claims, 2 Drawing Sheets

200

```
┌─────────────────────────────────────────────┐
│  Switch in 1ˢᵗ position – power first circuit, │
│ engaging heating element and thermostat for │
│           regular strength brew             │
│                    210                      │
└─────────────────────────────────────────────┘
                      │
                      ▼
┌─────────────────────────────────────────────┐
│ Switch in 2nd position – power second circuit,│
│ engaging diode to reduce wattage, extending │
│           brew cycle for strong brew        │
│                    220                      │
└─────────────────────────────────────────────┘
```

FIG. 2

DUAL-CIRCUIT COFFEE MAKER APPARATUS

CROSS-REFERENCE TO RELATED APPLICATIONS

This non-provisional utility patent application claims the benefit of U.S. Provisional Patent Application No. 62/303,978, filed on Mar. 4, 2016, which is incorporated herein by reference.

STATEMENT REGARDING FEDERALLY SPONSORED-RESEARCH OR DEVELOPMENT

None.

FIELD OF THE INVENTION

The invention relates generally to the field of electro-mechanical apparatuses, and more particularly, to an apparatus for brewing coffee that is configured with two circuits for choosing brew strength.

BACKGROUND

Drip-style coffee makers are known to heat water and pour (or drip) the heated water over loose coffee grounds so that the heated water extracts the coffee oils from the grounds before dripping into a carafe or other container. The strength of the resultant coffee is a function of the amount of time the heated water remains in contact with the coffee grounds and, therefore, the amount of coffee oils extracted. The variables involved here include the size of the grind, the quantity of grounds, and the amount of time the water remains in contact with the grounds.

With the advent of espresso machines, coffee shops, and designer coffee makers, there has been an increased demand for "strong" brewed coffee. Most people do not have access to espresso machines or a daily trip to a coffee shop. Many coffee drinkers would like to be able to brew stronger coffee right in their own homes with a traditional drip coffee maker. Recalling the variables involved in brewing stronger coffee, the regular homeowner is made to either use more coffee than normal or to purchase a finer grind. Both of these options result in more expense to the regular coffee drinker.

Some in the art have attempted to address this solution by introducing drip coffee makers with a "strong" setting. This setting effectively slows down the brew cycle so that, all other variables remaining equal, the effective time of contact between the heated water and the coffee grounds is increased. In this way, a standard coffee maker has been adapted to brew "regular" as well as "strong" coffee. The current state of the art solution, however, significantly increases the cost of the coffee maker since the "strong" capability is accomplished through complicated and expensive circuitry, printed circuit boards, and other electrical components.

It would be desirable, then, to have a drip-style coffee maker that is capable of brewing both regular and strong coffee, without complex circuitry, and at a low cost. Therefore, there exists a need in the art for a dual-circuit coffee maker apparatus that is low-cost and is adapted to brew both regular and strong coffee.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

A preferred embodiment of the present invention is directed to a dual-circuit coffee maker apparatus comprising a first circuit configured for brewing regular coffee, a second circuit configured for brewing strong coffee, and a double throw switch for choosing between the first circuit and the second circuit.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims, and accompanying drawings where:

FIG. 2 is a high level operational flow diagram of a method for selectively brewing regular strength coffee and strong coffee.

DESCRIPTION

Figure 1:
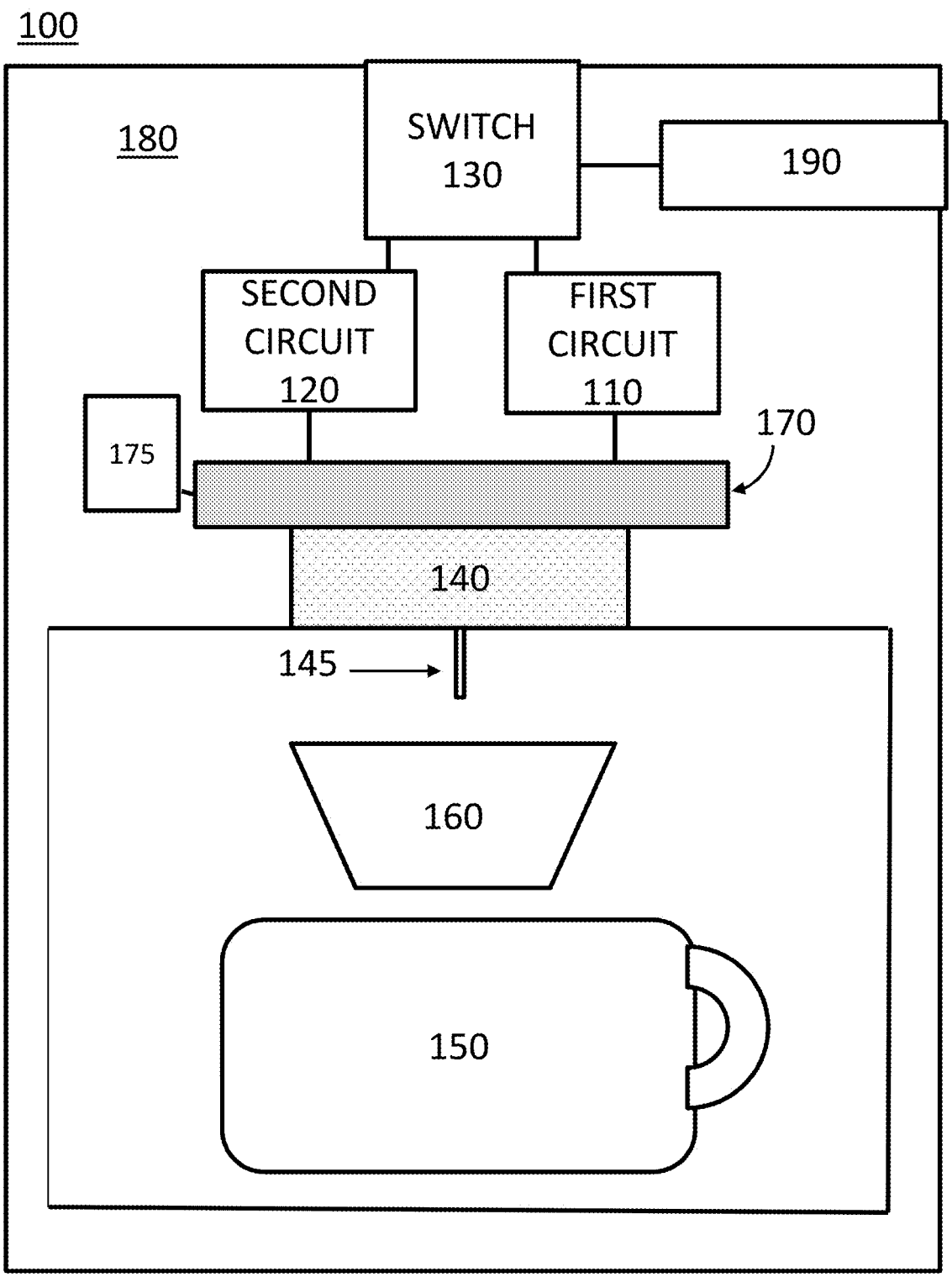
FIG. 1 is simplified block diagram showing the major components of an embodiment of the invention.

In the Summary above, in the Description below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40% means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Before describing in detail embodiments that are in accordance with the present invention, it should be observed that some of the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

While the specification will conclude with claims defining the features of embodiments of the invention that are regarded as novel, it is believed that the invention will be better understood from a consideration of the following description in conjunction with the figures, in which like reference numerals are carried forward.

Referring to the figures in general, and to FIG. 1 in particular, we describe a dual-circuit coffee maker apparatus 100. The dual-circuit coffee maker apparatus 100 includes various components that are known in the art of coffee makers including, among others, a housing 180, a reservoir 140 integral to the housing 180, a heating element 170, a shower head 145 a means of connecting to a power source 190 such as a power cord, a carafe 150, and a basket 160. A preferred embodiment of the present invention further comprises a first circuit 110, a second circuit 120, and a switch 130. The first circuit 110 and second circuit 120 are each electrically communicative to a power source 190 via the switch 130. Embodiments of the invention contemplate a switch 130 that is, for example, a double throw switch with three terminals. The switch 130 is electrically connected to a power source 190 via one terminal, to the first circuit 110 via a second terminal, and to the second circuit 120 via a third terminal. In this way, the position of the switch 130 determines which circuit is connected to the power source 190.

The first circuit 110 is the regular coffee maker circuit comprising a heating element 170 in line with a thermostat 175.

The second circuit 120 comprises a diode in series with the heating element 170 and thermostat 175. The diode is chosen such that it lowers the wattage in the circuit resulting in a slowed down brew cycle.

Referring to FIG. 2, in step 210 a user may toggle the switch 130 from an "off" position to a first position that connects the first circuit 110 to the power source 190. This engages the heating element 170 and the thermostat 175 to heat the water in the reservoir 140 for brewing regular coffee. For a stronger brew, in step 220 the user would toggle the switch 130 to a second position that adds the second circuit 120. With the diode in series with the heating element 170 and the thermostat 175, the wattage is reduced. The reduced wattage generated by the second circuit 120 slows down the brew cycle, which increases the extraction of the solids in the coffee, resulting in a stronger brew. This also allows for larger amounts of coffee to be used without overflowing the coffee filter.

It is understood that the variations and options disclosed above with respect to the components of the apparatus embodiments, are also applicable as variations and options with respect to the components for the system embodiments.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims.

The invention claimed is:

1. A dual-circuit coffee brewing apparatus comprising:
   a housing;
   a reservoir integral to the housing configured to contain an amount of water;
   a switch controlling a brew cycle, integral to the housing and electrically communicative with a power source;
   a heating element integral to the housing configured to heat the amount of water;
   a first circuit integral to the housing and electrically communicative with the switch, said first circuit configured for brewing regular coffee and comprising the heating element in line with a thermostat; and
   a second circuit integral to the housing and electrically communicative with the switch, said second circuit configured for brewing strong coffee and comprising a diode in series with the heating element and the thermostat.

2. The dual-circuit coffee brewing apparatus of claim 1 further comprising a power cord.

3. The dual-circuit coffee brewing apparatus of claim 1 wherein the switch is a double throw switch.

4. The dual-circuit coffee brewing apparatus of claim 3 wherein a position of the double-throw switch determines the brew cycle, the double-throw switch comprising:
   a first terminal electrically connecting the switch to the power source;
   a second terminal electrically connecting the switch to the first circuit; and
   a third terminal electrically connecting the switch to the second circuit.

5. The dual-circuit coffee brewing apparatus of claim 4 wherein, when the double-throw switch is thrown to a first position, the first circuit connects to the power source thereby causing the heater and the thermostat to heat the water in the reservoir to brew regular strength coffee; and
   wherein, when the double-throw switch is thrown to a second position, connecting the switch to the second circuit, thereby slowing down the brew cycle to brew strong coffee.

6. A method of brewing coffee in a dual-circuit coffee brewing apparatus, the method comprising:
   providing a switch for selecting brew strength on a housing of the dual-circuit coffee brewing apparatus, the switch in electrical communication with a power source;
   providing a first circuit in electrical communication with the switch, the first circuit comprising a heating element in line with a thermostat;

providing a second circuit in electrical communication with the switch, the second circuit comprising a diode in series with the heating element and the thermostat, wherein activation of the diode reduces wattage to the heating element;

based upon the switch being moved from an off position to a first position, connecting the first circuit to the power source, thereby activating the heating element and the thermostat, initiating a brew cycle to heat water in a reservoir for brewing regular strength coffee; and based upon the switch being moved to a second position, additionally connecting the second circuit to the power source, thereby activating the diode to slow down the brew cycle, resulting in a stronger brew of coffee.

\* \* \* \* \*